United States Patent

[11] 3,596,245

[72] Inventors Brian Finnie
Edinburgh;
Stephen R. Hodge, Midlothian, both of, Scotland
[21] Appl. No. 826,458
[22] Filed Mar. 21, 1969
[45] Patented July 27, 1971
[73] Assignee Hewlett-Packard Ltd.
West Lothian, Scotland

[54] DATA LINK TEST METHOD AND APPARATUS
6 Claims, 8 Drawing Figs.

[52] U.S. Cl. .......... 340/146.1
[51] Int. Cl. .......... H04b 3/46, H03k 5/18, G08c 25/00
[50] Field of Search .......... 340/146.1

[56] References Cited

UNITED STATES PATENTS 3,491,338 1/1970 Malloy .......... 340/146.1
3,512,150 5/1970 Ohnsorge .......... 340/146.1 X

FOREIGN PATENTS 141,180 12/1960 U.S.S.R. .......... 340/146.1

*Primary Examiner*—Eugene G. Botz
*Assistant Examiner*—R. Stephen Dildine, Jr.
*Attorney*—A. C. Smith

ABSTRACT: A controllable shift register is used in testing circuitry which measures statistical error rates and synchronization loss rates on digital data links such as are used for transmission of pulse-code modulated (PCM) signals by injecting into the data link a digital test signal having accurately known statistics and then comparing the resultant received signal with a test signal generated at the receiver for providing the desired error information.

Figure 1

INVENTORS
BRIAN FINNIE
STEPHEN R. HODGE

BY A. C. Smith
ATTORNEY

Programmable Multiple Return Shift Register

FEEDBACK LINE

Word Circulator

Error Detection / Resync

DATA LINK TEST METHOD AND APPARATUS

BACKGROUND OF THE INVENTION

Digital data links must be assessed according to different standards that commonly find no counterpart in analog or continuous-wave transmission systems. Of particular importance in digital data links are such factors as statistical errors in the received binary signal and the rate of loss of synchronization.

SUMMARY OF THE INVENTION

Accordingly, in the test circuitry of the present invention a digital test signal of known digital pattern and statistics is generated and applied to the data link under test at the transmitter end and is also generated at the receiver end for comparison with the digital test signal that is received over the data link. The digital test signal is derived from a shift register generator which can be set up to generate a pseudorandom binary signal or to generate a predetermined word which recirculates indefinitely. Also, a feed-forward shift register circuit is used to differentiate between synchronization loss and error bursts associated with the received signal.

DESCRIPTION OF THE PREFERRED EMBODIMENT

Figure 1:
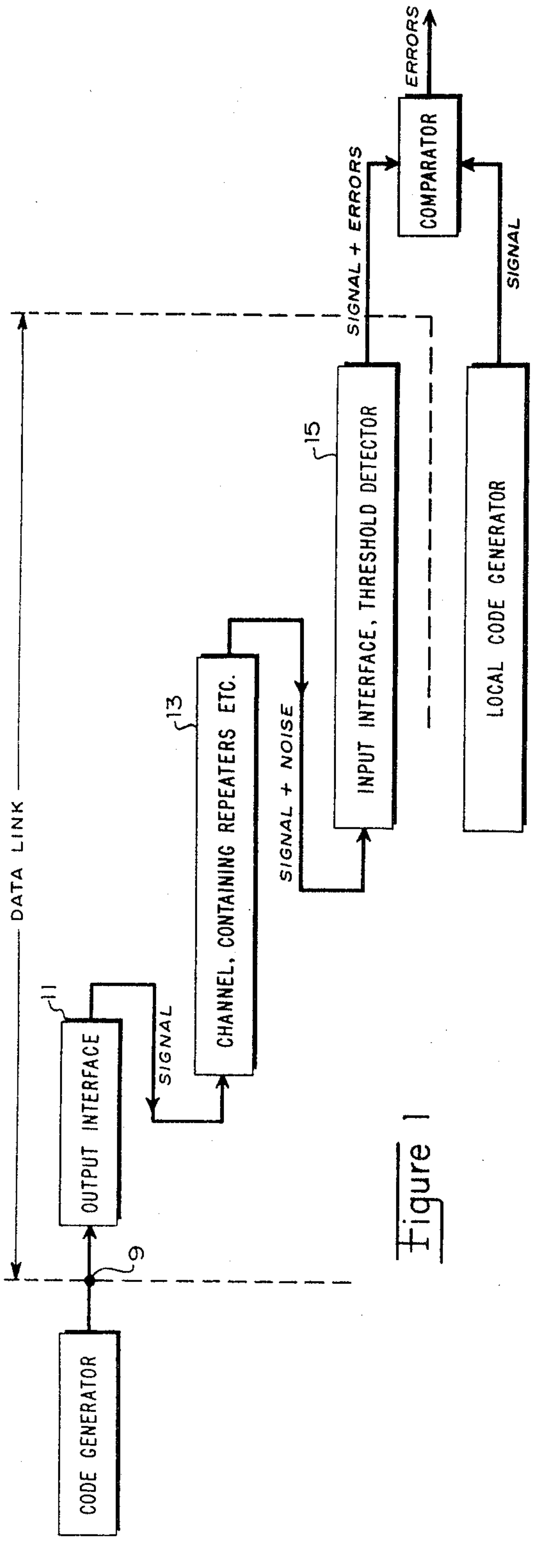
FIG. 1 is a block diagram showing the present test circuitry coupled to a digital data link.

Referring now to FIG. 1, there is shown a general arrangement of the present test circuitry and a data link under test. A digital signal from a signal source such as a telephone encoder, teleprinter, computer, or the like, is normally fed to the input 9 of suitable interfacing circuitry 11 and then to a transmission line or cable. The interface circuitry 11 may provide coding for error detection-correction purposes, insertion of synchronizing words, time division multiplexing, or the like, but these are features of the particular system rather than of digital data links generally.

The data channel 13 may contain repeaters (typically, PCM telephone links operating, for example, on 1.536 MHz in Great Britain and 1.544 MHz in the U.S.A. and have repeaters located every 2,000 yards). Such repeaters may have internal clock oscillators which are locked onto the incoming data bit rate. If the incoming data contains a long string of identical digits, the clock oscillator free-runs and may run slightly fast or slow. In this case, a bit of information may be gained or lost and thus synchronism of the system may be lost.

At the receiving end of the channel 13, interfacing equipment 15 performs the opposite function of converting the received data into the form in which it was originally generated. Since there is always noise present at the receiving end of such a link, any threshold detector used to distinguish the various levels of the digital signal is subject to errors.

To test such data links as these, it is often necessary to use a digital signal having well-defined statistics and a definite pattern which can be generated both at the transmitting end, and again at the receiving end. The locally generated pattern can then be compared with the received pattern, and errors in the received pattern can be analyzed. A suitable pattern for a digital test signal may be a circulating word, (e.g., 110100 110100 110100) or a pseudorandom binary sequence, but must be such that knowledge of a few digits enables the next digits to be uniquely determined. For example, in the above example; if the sequence 110100 is received then without doubt the next digit should be 1.

Figure 2:
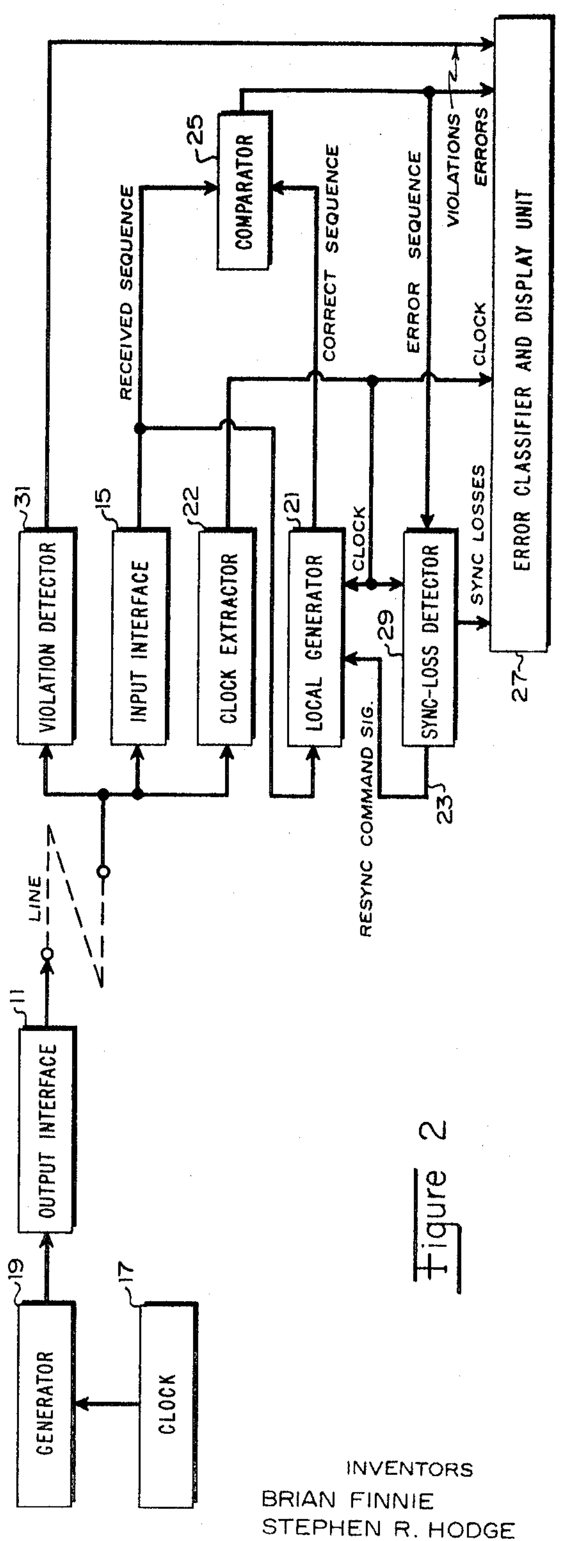
FIG. 2 is a block diagram of another embodiment of the present test circuitry which includes apparatus for detecting and correcting synchronization losses; 3 03 is a block diagram of a programmable multiple-return shift-register generator.

Referring now to FIG. 2, the digital test sequence is produced in synchronism with a clock 17 using a shift register generator (S.R.G.) 19 which can either be set up to generate a pseudorandom binary sequence or to circulate a predetermined word which is repeated indefinitely. Shift register generators of this type are described in the literature (see, for example, the *Hewlett-Packard Journal*, Sept. 1967, and "The Theory of Autonomous Linear Sequential Networks" by B. Elspas, *Trans. I.R.E. Circuit Theory*, Mar. 1959). Thus, the binary output of the generator is fed to the data link via a suitable interfacing unit 11 and at the receiving end is converted back into a form suitable for the logic circuitry used in the receiver by the input interface 15.

The receiver contains a generator 21 similar to that used in the transmitter but with an additional capability that upon a command signal applied to it via line 23 the digital signal generated thereby can be resynchronized on the received data in a very few clock periods. Normally, this command signal is "off" and the receiver generates an identical sequence of digits to that received at the input interface 15 but with no errors. The local generator 21 may be triggered by a clock extraction circuit 22 at the line/receiver interface 15 which generates a clock signal from the received signal if such a clock signal is not available at the receiver end of the line. The output sequence from the receiver generator 21 is then compared in comparator 25 with the received sequence so that the errors in the received sequence can be detected and fed to classification and display circuitry 27.

The error information from comparator 25 is also fed to a second shift register in synchronization-loss detector 20 which analyses the form of the error stream in order to distinguish between the ordered error pattern which results from a loss of synchronization and the error stream generated by other faults of the system. These latter errors may be random or correlated, but the nature of the circuitry, as described later herein, enables the exact form of the error pattern due to synchronization loss to be distinguished from any other error pattern that may arise. Thus, when detector 29 detects a loss of synchronization, it supplies a command signal to the receiver generator 21 via line 23 to enable the generator 21 to resynchronize with the received signal.

Additional circuits at the receiver end may include a violation detector 31 which enables violations of the format rules to be detected (e.g., for a bipolar or Pair Selected Ternay signal, as described in "An Experimental 224 Mbit/sec. Repeatered Line," *Bell System Technical Journal*, Sept. 1966, p. 933, certain sequences of +, 0, − pulses are not generated by the transmitter output interface but will generally appear at the receiver input when errors are present). Also, gating circuits (not shown) may be included in the receiver to prevent the display of error information when the error results from loss of synchronization and such loss of synchronization has been detected or is being corrected.

Figure 3:
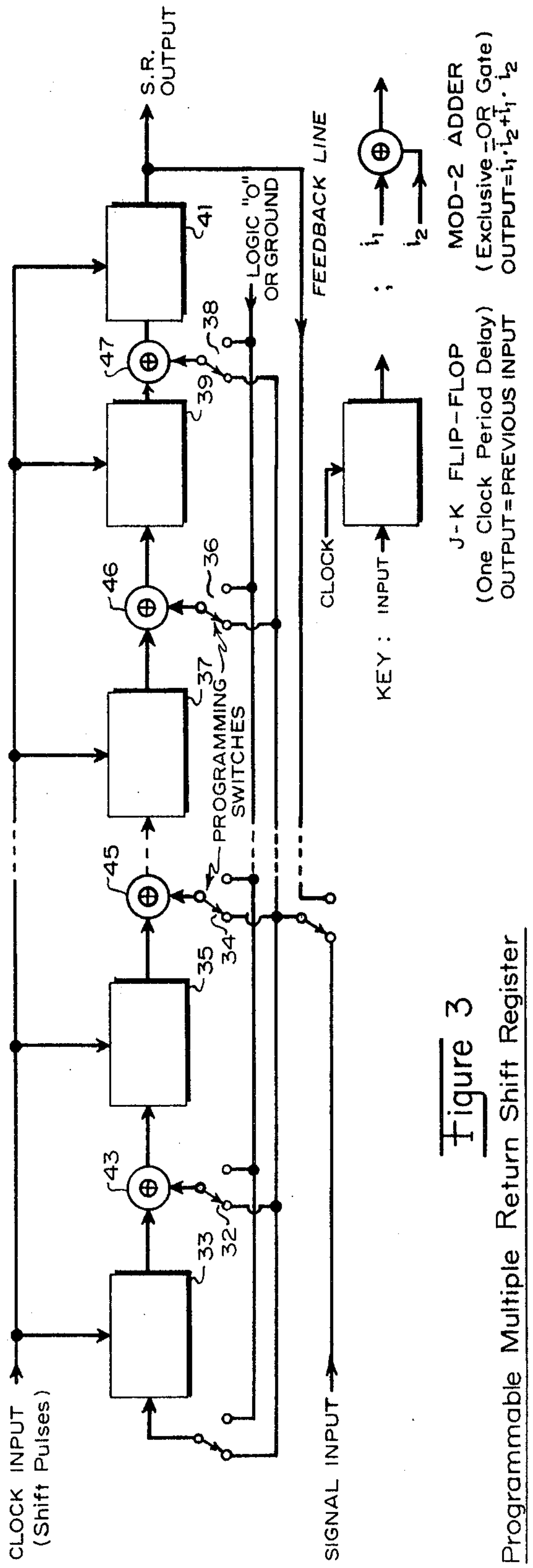
Figure 4:
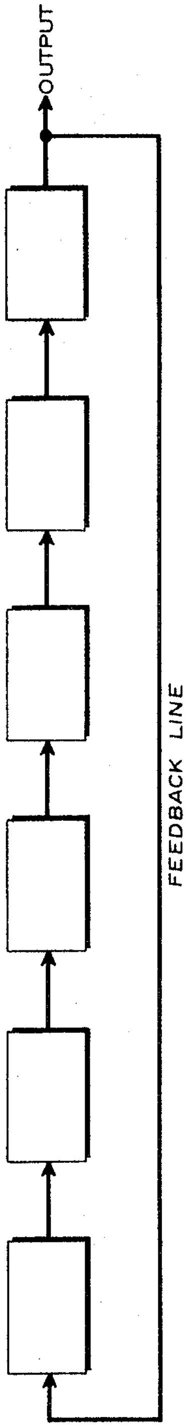
FIG. 4 is a block diagram of a simplified shift register word circulator.
Figures 5, 6:
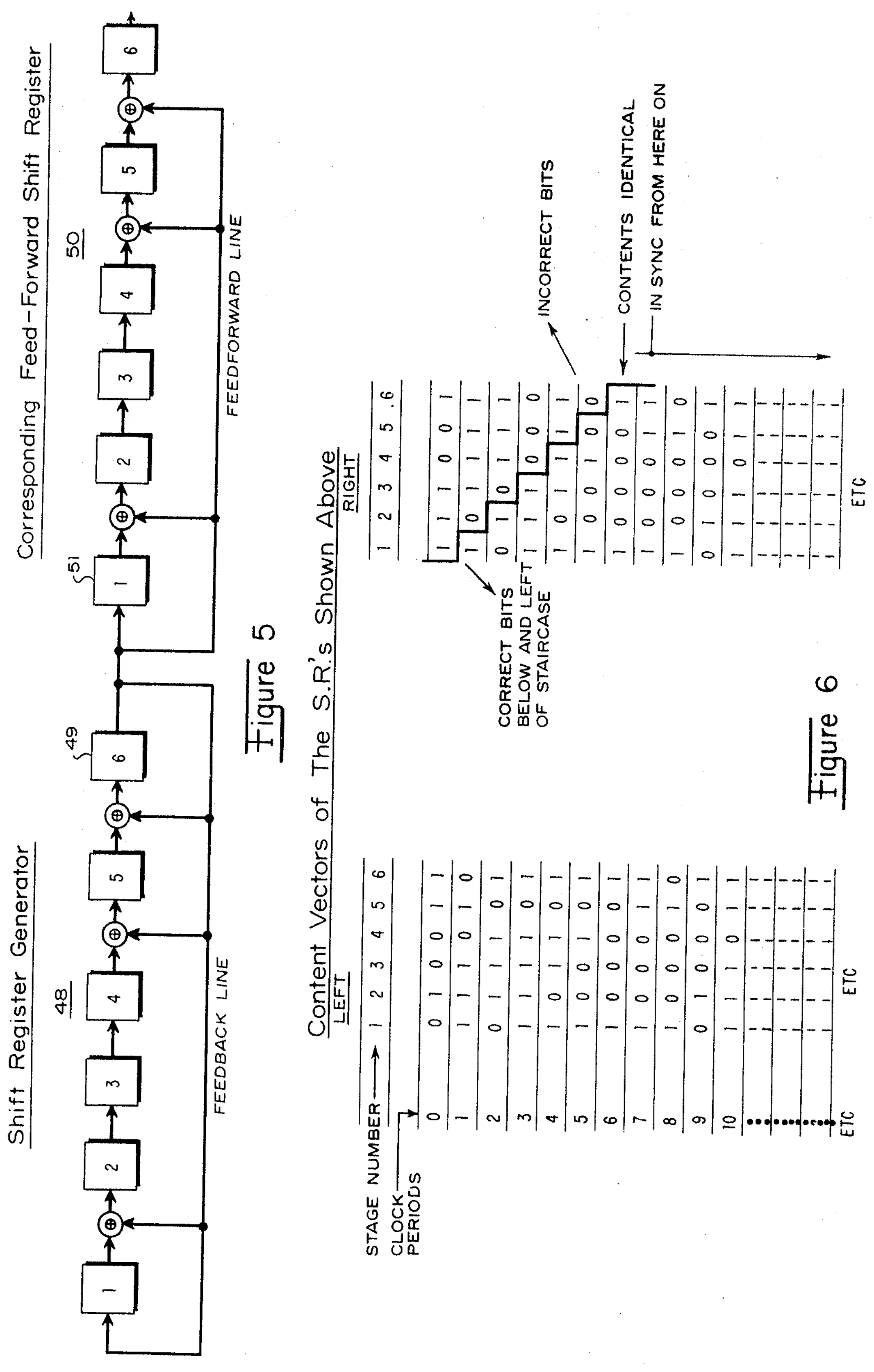
FIG. 5 is a block diagram of cascaded feedback and feed-forward shift registers according to the present invention.
FIG. 6 is a chart showing the synchronizing operation of the circuitry of FIG. 5.
Figure 7:
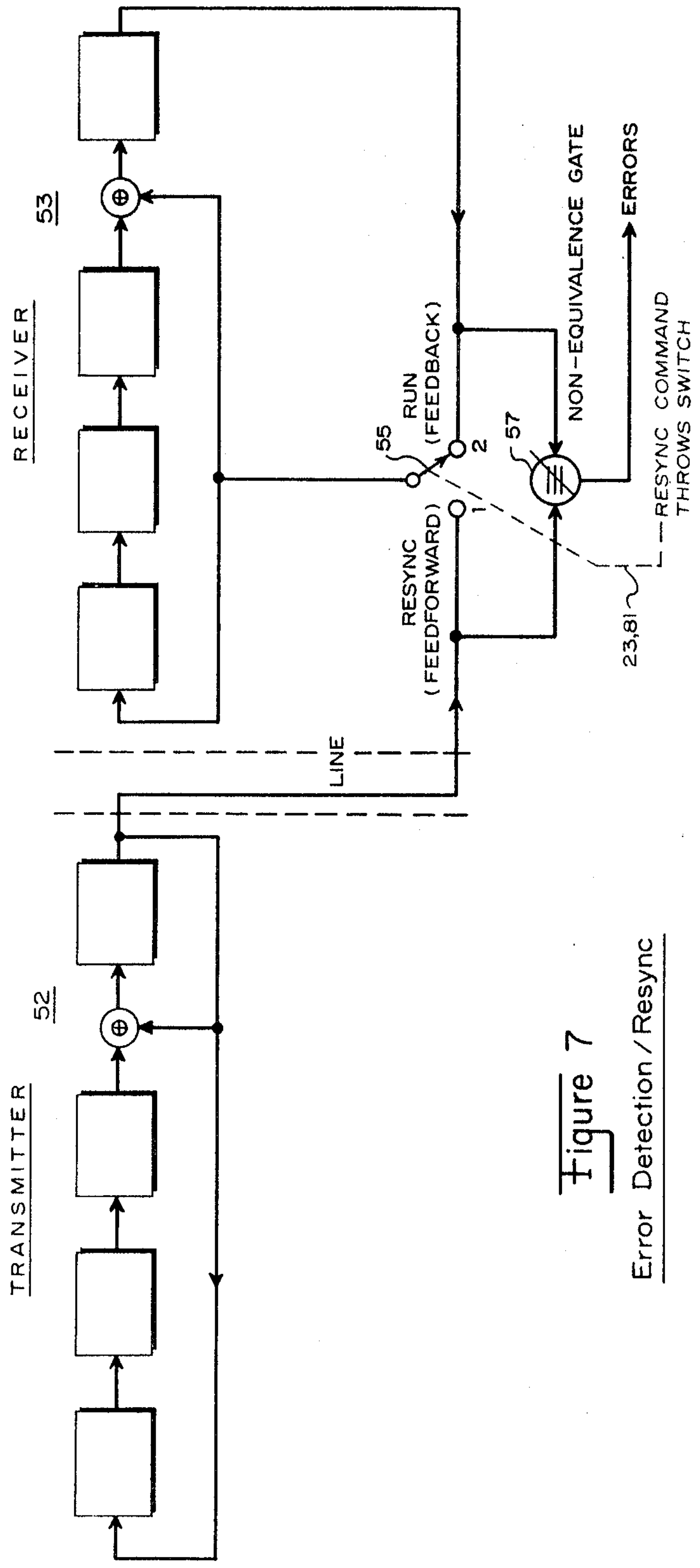
FIG. 7 is a diagram of the switching function required to enable resynchronization of the local generator.

Referring now to FIG. 3, there is shown a simplified form of the shift register generators used in the system of the present invention. Typically the shift register comprises a plurality of flip-flops 33—41 whose initial states may be programmed. Each flip-flop is coupled to receive clock pulses on one input and is also coupled through a programmable exclusive-OR gate 43—47 to receive on another input either the output of the preceding flip-flop or the modulo-2 sum of (i.e., output of the exclusive-OR gate of which the inputs are) the output of the preceding flip-flop and the output which is fed back from the last flip-flop 41 so that, in effect, the shift register may be connected according to any selected format by operating the programming switches 32—38. For simple fixed word circulation, the flip-flops may be set in selected initial states and the feedback inputs and the interstage gates may be disabled, as shown in FIG. 4, to provide a shift register word generator. (Clock pulse inputs are conventional and have been omitted hereinafter for simplicity.) Other delay means such as delay lines and monostable circuits may be used in place of the flip-flops. Also, a shift register generator similar to the one shown in FIG. 3 having feedback from the output of the last stage 49 to selected inputs (via interstage gates) may be connected to another shift register having identically positioned interstage gates which are connected to receive feed-forward signals from the input of the first stage 51, as shown in FIG. 5. In this configuration, it can be shown that after 6 clock pulses the contents of the shift register 50 second in line will be identical to the contents of the shift register 48 first in line. If this condition is not initially so, then for N-stage registers, not more than N clock pulses, applied simultaneously and at the same rates to the registers, will be required to synchronize the two registers. As an example, consider that the first-in-line register 48 has the initial contents 010011 and that the second-in-line register 50 has the initial contents 111001. Then, as shown in FIG. 6, after 6 shift (or clock) pulses the contents of the two registers are identical and remain so thereafter. This aspect of the present invention enables synchronization losses to be distinguished conveniently from error bursts by the synchronization-loss detector described later herein, and also enables resynchronization of the local generator following the detection of a loss of synchronism as follows:

Errors are detected by comparing the output signal of the local receiver generator with the received signal from the transmitter. FIG. 7 shows a four-stage example of an error detecting system according to the present invention in which the local receiver generator 53 is switchable to be either a feed-forward or a feedback shift register as required. With the switch 55 in position 2, the second (receiver) shift register 53 acts as an identical generator to that in the transmitter, and their outputs are compared to produce the desired error information at the output of the nonequivalence gate 57 that is connected to receive the outputs of the transmitter and receiver shift registers 52 and 53. With the switch 55 in the position 1, the resynchronizing process described in connection with FIG. 5 will take place so that the receiver synchronizes with the received data provided that N bits of data (where $N=4$ in FIG. 7, $N=6$ in FIG. 5) are received consecutively without intervening errors.

If the received sequence and the locally generated sequence lose synchronism with one another, then the error pattern thus produced will be a periodic sequence. This sequence will be the same as the locally generated sequence, or in the case of nonmaximal generators will be one of the sequences which can be generated by the local or transmitter generators in the configuration in which they are being used. That is, for word circulation and for pseudorandom binary sequences of nonmaximal or maximal period, the error sequence is a shift-and-add sum of the original sequence.

The shift-and-add properties of maximal-length sequences are well known and are described in the literature (see, for example, "Introduction to Linear Shift-Register Generated Sequences," University of Michigan Research Institute, Technical Report No. 90, Oct. 1958, A.D. No. 281272). For any shift other than zero, the new sequence produced is identical to the original sequence but is shifted with respect to both of them, and for zero shift, the modulo-2 sum is always zero.

For nonmaximal sequences, a new sequence is generally produced by the shift-and-add process, but this new sequence is always one of the other sequences generated by the same shift register generator. The length of the new sequence is always the same as, or is a factor of the length of, the original sequence. For example, the 6-bit sequence 110011 generated by a four-stage shift register generator having feedback to the first and third stages gives rise to the following sequences:

| | | |
|---|---|---|
| 1-bit shift | 001010 | (a new 6-bit sequence) |
| 2-bit shift | 001111 | (6-bit sequence identical to original) |
| 3-bit shift | 101101 | (a new 3-bit sequence) |

Table Continued

| | | |
|---|---|---|
| 4-bit shift | 111100 | (a nbt sequence) |
| 4-bit shift | 111100 | (6-bit sequence identical to original) |
| 5-bit shift | 010100 | (a new 6-bit sequence identical to sequence generated by 1-bit shift) |

Each of these sequences repeats every six bits (sometimes less, but never more) and thus can be used at the input to the feed-forward register 59 at the receiver end for the detection of loss of synchronization.

For word circulation, this is merely a particular case of nonmaximal sequence generation, and the shift-and-add properties are identical to those for nonmaximal sequence generation.

Figure 8:
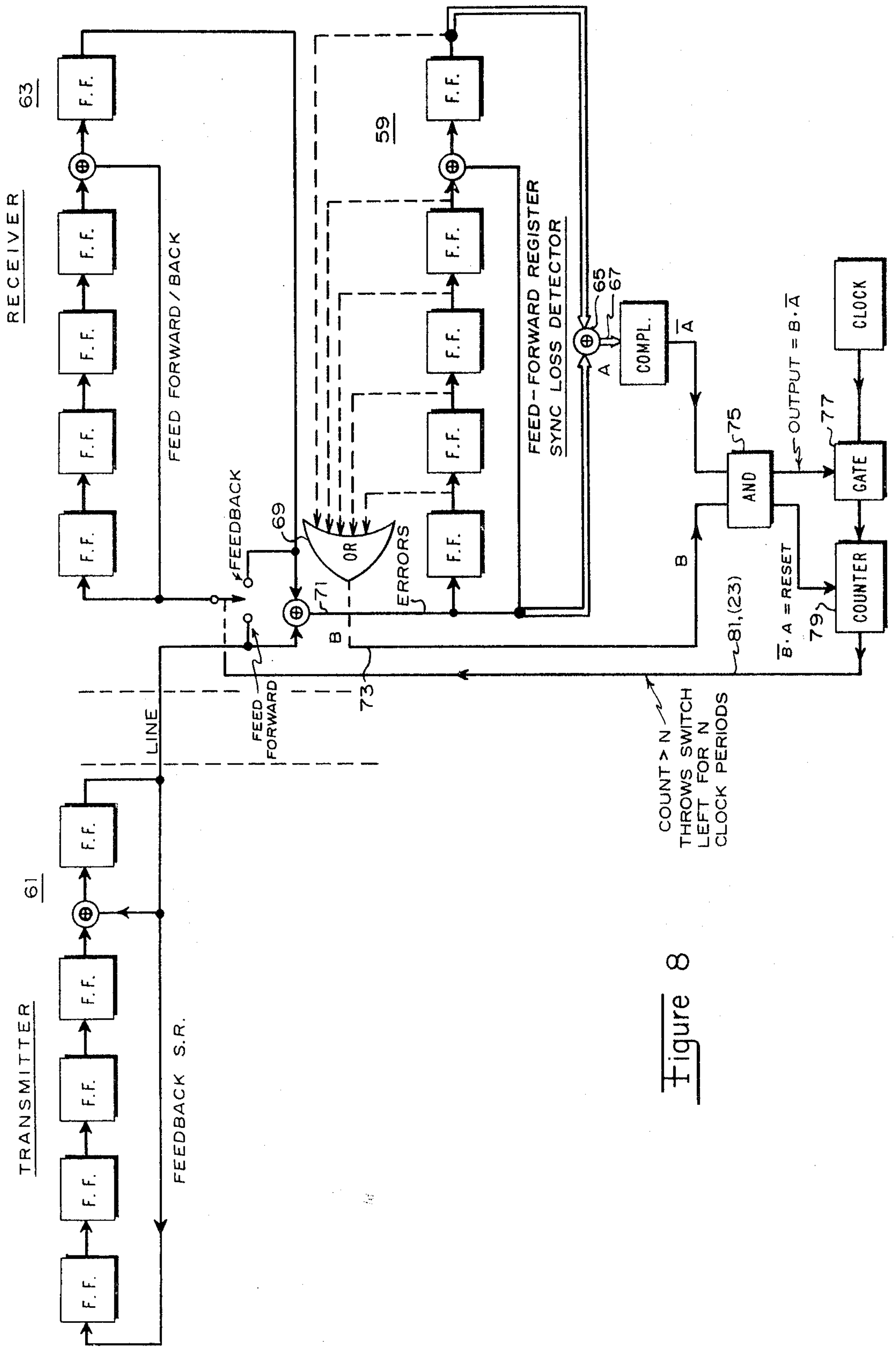
FIG. 8 is a block diagram of the synchronization loss detection circuitry of the present invention.

In a maximal generator (and in a word circulator which is only a special case of the latter) then if the error sequence is due to a synchronization loss and is thus a shift-and-add sum, it can be recognized by an additional feed-forward shift register 59, as shown in FIG. 8, the input to which is the output of the error detector (in the binary case, the comparator is merely a modulo-2 adder; systems having other moduli can be accommodated using other types of linear comparison circuits which take the modulo-$n$ difference between the two inputs rather than the sum. In modulo-2, the sum and difference are identical functions.) Further information on feedback shift register generators using higher moduli than 2 is available in the literature (see B. Elspas, op. cit.).

In FIG. 8, the synchronization-loss detecting shift register 59 is connected to recognize the sequence of errors caused by a loss of synchronization. The error line 71 contains the shift-and-add sum of the outputs of the two generators 61, 63 which is the error sequence caused by the loss of synchronization. The feed-forward shift register 59 "locks" onto the error sequence as though it were generated by a single generator having the same structure as one of the two shift registers 61, 63 of FIG. 8. Thus, after N clock periods from the time of the synchronization loss, the last stage of the synchronization-loss detector shift register 59 contains the same bit (0 or 1) as the input terminal 71, since this terminal carries the last bit of the hypothetical single generator formed by the two shift registers 61, 63. Thus, by comparing the input and the output of the synchronization-loss detector 59 in gate 65, an indication of a synchronization loss having occurred is obtained at gate output 67.

An OR gate 69, as shown dotted in FIG. 8, is provided to distinguish between the following operating conditions:

When the shift register generators 61 and 63 are synchronized, output 71 of the error detector is a string of zeros, and thus the signal A at output 67 will also be a zero whenever the system is synchronized. However, this case can be distinguished from the synchronization-loss case by the fact that when a synchronization loss has occurred, there is always at least one stage in the synchronization-loss detector shift register 59 containing a logic "1." Thus, OR gate 69 connected to each of the stages of the shift register 59 produces an output "1" at terminal 73 (signal B) when a synchronization loss has occurred. Thus, the states in which the synchronization-loss detector 59, 65, 69, etc. can exist are as follows:

1. IN SYNCHRONIZATION: NO ERRORS
   A=0 always
   B=0 always
2. IN SYNCHRONIZATION: ERRORS PRESENT
   A = is indeterminate for N bits following each error; thereafter A = 0
   B = 1 for up to N bits following the error
3. OUT OF SYNCHRONIZATION: NO ERRORS
   A = 0 after the first N bits of lost synchronization,
   A is indeterminate during the 1st N periods following the synchronization-loss
   B = 1 always
4. OUT OF SYNCHRONIZATION: ERRORS PRESENT
   A and B are indeterminate, but if 2N consecutive correct bits are received, the logical process to be described will correctly distinguish the loss of synchronization.

This logical process is as follows

A and B are fed to an AND gate 75 which enables gate 77 to permit counter 79 to count clock periods when the output of AND gate 75 is a logic 1. This corresponds to case 3) above. If either A becomes a logic "1" or B becomes a logic "0," the counter 79 is reset to zero. If the counter 79 reaches a count of N (the minimum number of periods necessary to ensure that the conditions set up are due to a loss of synchronization) then a command signal is sent via line 81, (23) to the receiver generator 63 to convert it to a feed-forward shift register, as shown in FIG. 7. Shift register 63 is held in this configuration for N clock periods after which the counter 79 is reset and the synchronization-loss detecting shift register 59 is reset to zero. This period enables the shift register to resynchronize on the received data provided the data is correct.

Use has been made herein of the so-called multiple return generator as described by B. Elspas (op. cit.). However, the principles involved work equally well with simple generators of the type commonly described in the literature but Multiple generators have certain advantages such as speed and programmability not possessed by simple generators. For every multiple return generator, there is a corresponding simple generator which produces identical sequences and vice versa. Thus, multiple-return shift registers, shift registers, and more complex feedback-within-feedback shift registers may be used in accordance with the present invention.

Thus, the synchronization-loss detection and resynchronization process takes 3N clock periods to perform (N periods to set up the synchronization-loss detecting shift register 59; N periods to ensure that the subsequent conditions are due to a synchronization loss, and N periods to resynchronize) rather than about $2^N$ periods typically required for a systematic search through a maximal length sequence. In practice, for a 30-stage maximal shift register running at 100 MHz, the detection and resynchronization process of the present invention takes less than 1 microsecond rather than the 10 second sequence length for a conventional systematic search.

We claim:

1. In digital signal apparatus including a plurality of cascaded logic elements forming a shift register stage which has an output and which has a signal port coupled to an input of the cascade arrangement and to an auxiliary input intermediate a pair of logic elements in the cascade arrangement and which operates through a selected sequence of digital signals in response to signals applied to the signal port from the output of the cascade arrangement, the method of selectively synchronizing the operation of the cascade arrangement of logic elements to the operation of a source which produces digital signals in said selected sequence comprising the steps of:

connecting the signal port to receive the digital signals from the source to alter the signal appearing at the output of the cascade arrangement;

comparing the digital signal received from the source with the signal at the output of the cascade arrangement for determining the establishment of a predetermined relationship between the sequences thereof; and altering the connection of the signal port to receive the output of the cascade arrangement in response to establishment of said predetermined relationship for operating the cascade arrangement of logic elements through said selected sequence in synchronism with operation of the source through the same selected sequence.

2. Digital signal apparatus comprising:

first means including a plural number of logic elements, each of said logic elements having an input and an output and being operable to produce a signal at said output a selected time interval after the application of a signal to said input; and including coupling means coupling the output of one of the logic elements of the first means to the input of another logic element of the first means for forming a primary signal circuit of cascaded logic elements and for providing at least one auxiliary signal input between a pair of said plural number of logic elements;

a signal input;

at least one auxiliary signal circuit coupled to an auxiliary signal input and to the input of a logic element which precedes the auxiliary signal input in the cascaded logic elements of the primary signal circuit of the first means; said auxiliary signal circuit being operable to apply to the auxiliary signal input and to the input of said one logic element a selected one of either a signal present at said signal input for operation through a sequence of logic states in response to signals at said signal input or a signal present at the output of a logic element which succeeds the auxiliary signal input in the cascaded logic elements of the primary signal circuit for recurring operation through a sequence of logic states.

3. Digital signal apparatus comprising:

first means including a plural number of logic elements, each of said logic elements having an input and an output and being operable to produce a signal at said output a selected time interval after the application of a signal to said input; and including coupling means coupling the output of one of the logic elements of the first means to the input of another logic element of the first means for forming a primary signal circuit of cascaded logic elements and for providing at least one auxiliary signal input between a pair of said plural number of logic elements;

a signal input;

at least one auxiliary signal circuit coupled to an auxiliary signal input and to the input of a logic element which precedes the auxiliary signal input in the cascaded logic elements of the primary signal circuit of the first means; said auxiliary signal circuit being operable to apply to the auxiliary signal input and to the input of said one logic element a selected one of either a signal present at said signal input for operation through a sequence of logic states in response to signals at said signal input or a signal present at the output of a logic element which succeeds the auxiliary signal input in the cascaded logic elements of the primary signal circuit for recurring operation through a sequence of logic states;

second means including said plural number of logic elements, each having an input and an output and being operable to produce a signal at said output a selected time interval after the application of a signal to said input;

coupling means for said second means coupling the output of at least one logic element of the second means to the input of at least another logic element of the second means for operating recurringly through a sequence of logic states which is similar to a sequence of logic states produced during recurring-sequence operation of the first means; and circuit means including a digital signalling circuit for applying the recurring sequence of logic states from the second means to the signal input of the first means.

4. Digital signal apparatus as in claim 3 comprising:

control means coupled to said signal input and to the output of said logic element which succeeds the auxiliary signal input of the first means for controlling the selection of the signal at said signal input for synchronizing the operation of the logic elements of the first and second means through a sequence of logic states, and the output signal of the first means for providing an indication of error in the transmission of a sequence of logic states from the second means to the first means through said digital signalling circuit.

5. Digital signal apparatus comprising:

first means including a plural number of logic elements, each of said logic elements having an input and an output and being operable to produce a signal at said output a selected time interval after the application of a signal to said input; and including coupling means coupling the output of one of the logic elements of the first means to the input of another logic element of the first means for forming a primary signal circuit of cascaded logic elements and for providing at least one auxiliary signal input between a pair of said plural number of logic elements;

a signal input;

at least one auxiliary signal circuit coupled to an auxiliary signal input and to the input of a logic element which precedes the auxiliary signal input in the cascaded logic elements of the primary signal circuit of the first means; said auxiliary signal circuit being operable to apply to the auxiliary signal input and to the input of said one logic element a selected one of either a signal present at said signal input for operation through a sequence of logic states in response to signals at said signal input or a signal present at the output of a logic element which succeeds the auxiliary signal input in the cascaded logic elements of the primary signal circuit for recurring operation through a sequence of logic states;

gate means coupled to receive the signal at said signal input and the signal at said output of a logic element of the first means for producing an error output signal as the combination of such signals;

additional means including a plural number of logic elements, each of said logic elements having an input and an output and being operable to produce a signal at said output a selected time interval after the application of a signal to said input;

coupling means coupling the output of one of the logic elements of said additional means to the input of another logic element of said additional means for forming a primary signal circuit of cascaded logic elements and for providing at least one auxiliary signal input between a pair of said plural number of logic elements of said additional means, the arrangement of logic elements and auxiliary signal inputs in said first and additional means being substantially similar;

at least one auxiliary signal circuit coupled to an auxiliary signal input and to the input of a logic element which precedes the auxiliary signal input in the cascaded logic elements of the primary signal circuit of said additional means, and operable to apply signals on said auxiliary signal circuit to the input of said one logic element and to said auxiliary signal input;

means coupled to the auxiliary signal circuit of said additional means for applying thereto said error output signal from the gate means; and control input means coupled to an output of a logic element of said additional means succeeding said auxiliary signal input in the primary signal circuit of said additional means, and coupled to receive said error output signal for controlling the selection in the first means of either the signal present at said signal input or said signal present at the output of said logic element of the first means which succeeds said auxiliary signal input.

6. Digital signal apparatus as in claim 5 wherein said control input means also includes:

a first gate coupled to receive signals at the outputs of the logic elements of said additional means for producing a first reference output signal as a logic combination of such outputs;

a second gate coupled to receive the output of a logic element of said additional means succeeding said auxiliary signal input in the primary signal circuit of the additional means, and coupled to receive said error output signal for producing a second reference output signal; and a synchronizing circuit responsive to the recurrence of a logic combination of the first and second reference output signals a number of times greater than said plural number of logic elements of said first means for operating said auxiliary signal circuit of the first means to receive signal present at said signal input for synchronizing the operation of the logic elements of the first means through a sequence of logic states with a sequence of logic states appearing on said signal input.

UNITED STATES PATENT OFFICE

CERTIFICATE OF CORRECTION

Patent No. 3,596,245 Dated July 27, 1971

Inventor(s) Brian Finnie and Stephen R. Hodge

It is certified that error appears in the above-identified patent and that said Letters Patent are hereby corrected as shown below:

Column 1, line 32, "3 03" should read -- Figure 3 --;

Column 2, line 37, "20" should read -- 29 --;

Column 4, line 2, cancel the first line under "Table Continued" as follows:

4-bit shift 111100 (a nbt sequence) ;

line 16, after "maximal" insert -- or a non-maximal --; in the chart appearing between lines 60 and 75, 3. should read --

3. OUT OF SYNCHRONIZATION: NO ERRORS

A = 0 after the first N bits of lost synchronization, and subsequently always 0
A is indeterminate during the 1st N periods following the synchronization-loss
B = 1 always Signed and sealed this 15th day of February 1972.

(SEAL)
Attest:

EDWARD M.FLETCHER,JR.
Attesting Officer

ROBERT GOTTSCHALK
Commissioner of Patents

ORM PO-1050 (10-69)
-160010

USCOMM-DC 60376-P69
★ U.S. GOVERNMENT PRINTING OFFICE : 1969 O—366-334